June 6, 1950          A. P. DENIS          2,510,622
CABLE SHORTENING DEVICE
Filed April 3, 1948
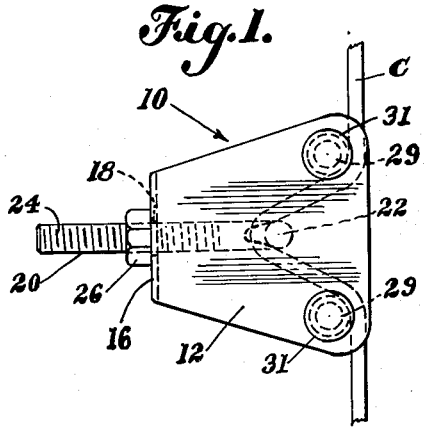
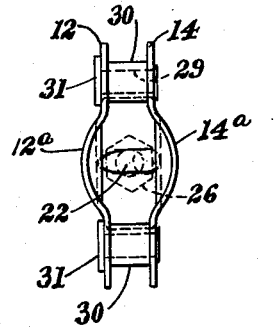
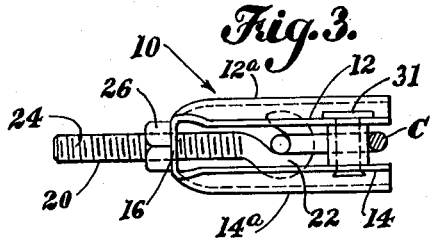
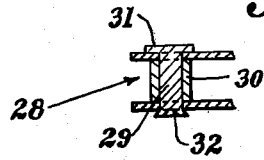
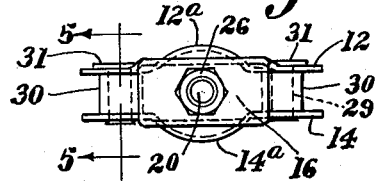
INVENTOR.
Albert P. Denis
BY Harold E. Cole
Attorney

Patented June 6, 1950

2,510,622

UNITED STATES PATENT OFFICE 2,510,622

CABLE SHORTENING DEVICE

Albert P. Denis, Springfield, Mass.

Application April 3, 1948, Serial No. 18,772

2 Claims. (Cl. 24—71.1)

This invention relates to a cable shortening device.

The principal object of my invention is to provide a device to shorten the cable of automobile braking apparatus or the like that is simple in construction and use and can be manufactured economically.

I am aware that cable shortening devices are well known, and it has been my object to improve upon them by making mine especially compact, certain in the operation of tightening and holding the cable, and capable of being manufactured at an unusually low cost.

The foregoing and other objects which will appear as the nature of the invention is better understood, may be accomplished by a construction and combination of parts such as is disclosed by the drawings and specification. The nature of the invention is such as to render it susceptible to changes and modifications, and, therefore, I am not to be limited to said disclosure; but am entitled to all such changes therefrom as fall within the scope of my claims.

In the drawings:

Figure 1 is a top plan view of my cable shortening device showing a cable and how it is shortened.

Figure 2 is a front elevational view of my device, Figure 3 is a side elevational view and Figure 4 is a rear elevational view thereof.

Figure 5 is a sectional view taken on the line 5—5 of Figure 4.

As illustrated my device has a housing 10 with a top portion 12 an intermediate portion of which bulges outwardly as at 12a, a bottom portion 14 having a similar said bulging portion 14a, and a rear portion 16 having a hole 18 therein. Said top, bottom and rear portions 12, 14 and 16 are preferably integral and made of metal or other strong material. Said housing 10 is open at the front where the cable C to be tightened is inserted into the housing in loop form, as shown in said Figure 1.

A tightener member 20, shown in the form of a screw, a portion of which extends through said hole 18 into said housing 10, has a hook portion 22 at one end and it is threaded as at 24 for a portion of its length. A take-up member in the form of a screw-threaded nut 26 is in screw-threaded engagement with said screw-threaded portion 24 and is always outside said housing 10. The loop formed in said cable C when it is inserted into said housing 10 is engaged by said hooked portion 22 as shown in said Figure 1. When said nut 26 is screwed against said housing rear end portion 16 said tightening member 20 draws said cable C farther into said housing 10 thus tightening said cable C in length.

Set in said housing top and bottom portions 12 and 14 adjacent the housing front opening, and near opposite side extremities as shown in said Figure 1, are guides 28, one on each side. These each have a pin 29 set in said top and bottom portions 12 and 14 and which bridge the space between them. One end of each said pin 29 has a button head 31 while the other end is headed over as at 32, thus securely holding said pin in said housing 10. A bushing 30 is mounted on each said pin, preferably rotatably mounted, extends between said top and bottom portions 12 and 14 as shown in said Figure 5.

The space between said top and bottom bulging portions 12a and 14a is sufficient to permit said hook portion 22 to be turned completely around, whereas the space elsewhere between said top and bottom portions 12 and 14 is insufficient to do so.

What I claim is:

1. A cable shortening device comprising a housing embodying top and bottom portions spaced apart and a rear portion connecting said top and bottom portions and having a hole therein, connecting members at opposite sides of said top and bottom portions sufficiently spaced apart to insert a cable loop between them into said housing, a tightener member movably extending through said hole into said housing and unattached to any portion of said housing and embodying a cable attaching portion of greater width than said hole, and a take-up member outside said housing connected to and adapted to be moved on said tightener member and against the outside of said housing rear portion in the tightening operation whereby the distance said tightener member extends into said housing may be varied, said housing top and bottom portions having bulging portions therein centrally located intermediate said connecting members thereby providing a channel in said housing of sufficient depth to permit said cable attaching portion to move towards or away from said rear portion, said cable attaching portion being wider than the space between said top and bottom portions except at said bulging portions.

2. A cable shortening device comprising a housing embodying top and bottom portions spaced apart and a rear portion connecting said top and bottom portions and having a hole therein, connecting members at opposite sides of said top and bottom portions sufficiently spaced apart to insert a cable loop between them into said housing, a screw-threaded tightener member movably extending through said hole into said housing and unattached to any portion of said housing and embodying a hook portion of greater width than said hole and a screw-threaded take-up member outside said housing screw-threadedly connected to and adapted to be moved on said tightener member and against the outside of said housing rear portion in the tightening operation whereby the distance said tightener member extends into said housing may be varied, said housing top and bottom portions having bulging portions therein centrally located intermediate said connecting members thereby providing a channel in said housing of sufficient depth to permit said hook portion to move towards or away from said rear portion, said hook portion being wider than the space between said top and bottom portions except at said bulging portions.

ALBERT P. DENIS.

REFERENCES CITED

The following references are of record in the file of this patent:

UNITED STATES PATENTS

| Number | Name | Date |
| --- | --- | --- |
| 1,276,702 | Anderson | Aug. 27, 1918 |
| 1,355,322 | Feeney | Oct. 12, 1920 |
| 2,336,818 | Topinka | Dec. 14, 1943 |
| 2,456,895 | Sattler | Dec. 21, 1948 |